Dec. 15, 1970 J. C. BOYROS 3,546,711
HEART VALVE
Filed April 9, 1968
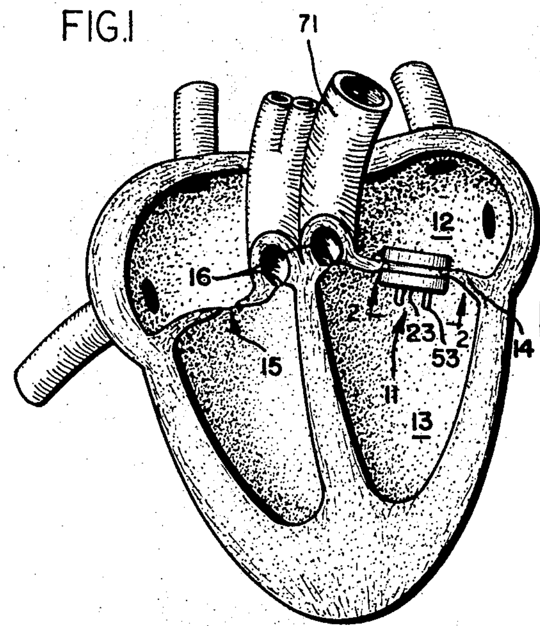
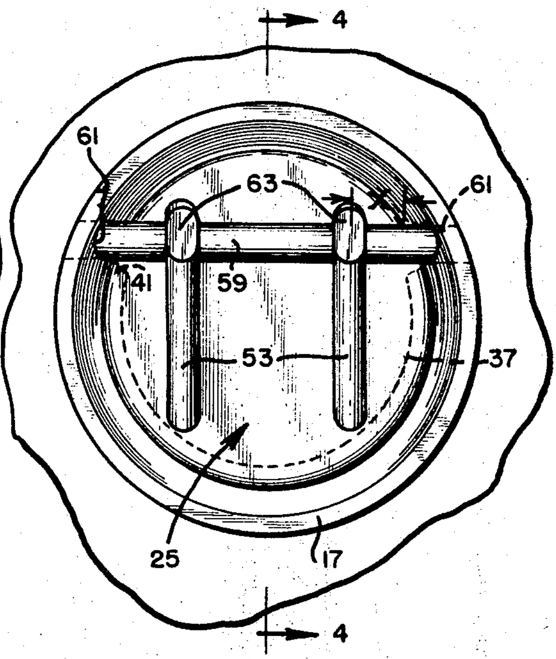
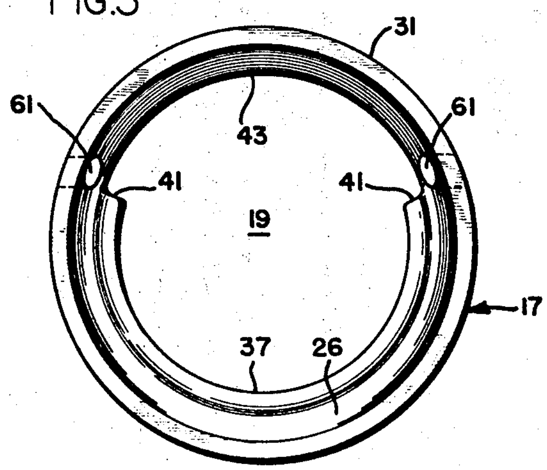
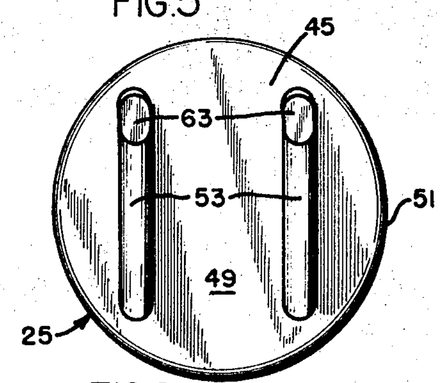
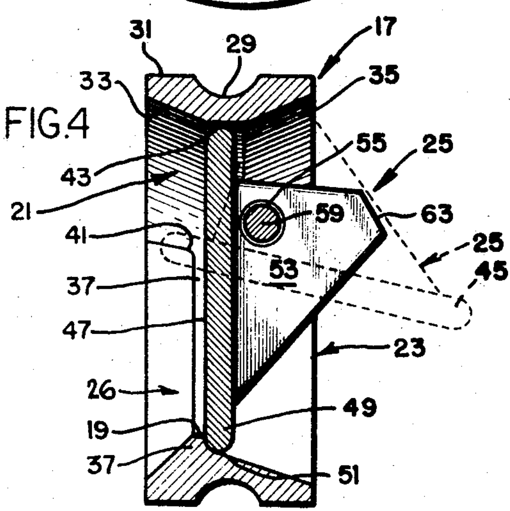
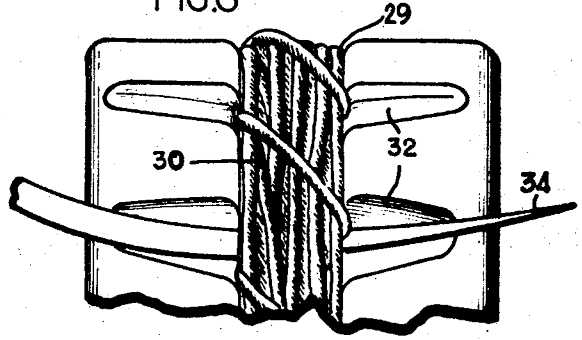
INVENTOR
JACK C. BOKROS
Anderson, Luedeka, Fitch, Even, & Tabin
ATTYS.

United States Patent Office 3,546,711

Patented Dec. 15, 1970

3,546,711

HEART VALVE

Jack C. Bokros, San Diego, Calif., assignor to Gulf Energy & Environmental Systems, Inc., San Diego, Calif., a corporation of Delaware Filed Apr. 9, 1968, Ser. No. 719,985

Int. Cl. A61f *1/22*

U.S. Cl. 3—1 8 Claims

ABSTRACT OF THE DISCLOSURE

A cardiac valve is made of size and shape suitable for insertion into a heart having a defective natural valve and is provided with a valve body having a central bore through which blood may flow with a minimum of turbulence. A valve gate is pivotally mounted in the bore of the valve body in a manner that allows the blood flowing through the valve to wash the surfaces of the gate to prevent thrombus formation on its surfaces. The gate is pivoted on surfaces which are also washed with blood and are protected from binding or entanglement in the event of growth of scar tissue about the valve body.

This invention relates to a cardiac valve and more particularly to a valve for insertion into a heart having a defective natural valve.

Artificial heart valves must meet exceedingly exacting operational requirements, such as affording a smooth non-turbulent flow of blood through the valve when a gate of the valve moves between an open and closed position. Turbulence in the blood stream due to the valve opening or closing can result in damage to blood cells. Also, the valve must allow continuous and free flow of the blood through the valve to prevent any of the blood collecting or stagnating in pockets within the valve since such collection and stagnation may cause formation of blood clots. Moreover, the material of the valve coming into contact with the blood should be biologically inert so as not to damage the blood.

Unlike most valves used in industrial applications, the heart valve is not accessible for lubrication or maintenance and must of necessity perform millions or even billions of operations after it is implanted in the heart without failing. Thus, it will be appreciated that the heart valve must be capable of long sustained cyclic opening and closing operations and be relatively trouble and maintenance free. One source of potential trouble, which may bind the gate for the valve, is the growth of scar tissue in or about the valve body, particularly at the location of the pivot for the valve gate. The replacement heart valve, thus, has exacting requirements which have been very difficult to meet.

Accordingly, a general object of the invention is to provide an improved, as contrasted with the prior art, cardiac valve.

Other objects and advantages of the invention will become apparent from the detailed description taken in connection with the accompanying drawings in which:

FIG. 1 is a diagrammatic illustration of the heart valve positioned within a human heart;

FIG. 2 is an enlarged view taken substantially along the line 2—2 of FIG. 1;

FIG. 3 is a plan view of a valve body for the valve of FIG. 1;

FIG. 4 is a sectional view taken substantially along the line 4—4 of FIG. 2;

FIG. 5 is an elevational view of a gate for the valve of FIG. 1; and

FIG. 6 is a fragmentary view of a ring on the outer wall of the valve for securing the valve in a heart.

As shown in the drawings for purposes of illustration, the invention is embodied in a heart valve 11 adapted for use as a mitral valve between the right auricle 12 and right ventricle 13 of a human heart. The valve is disposed in a membrane 14 which separates the right auricle and right ventricle and is at the location for a natural mitral valve, such as the mitral valve 15, illustrated for the left auricle and left ventricle. The valve 11 would be effective for use as an aortic valve if it were made considerably smaller and substituted for one of the natural aortic valves 16.

The heart valve 11 includes, very generally, a valve body 17 having an internal bore 19 (FIGS. 3 and 4) with an inlet opening 21 through which the blood flows into the bore to exit at an outlet opening 23 for the bore. A gate 25 is pivotally mounted in the valve body to move between a closed position, as illustrated in solid lines in FIG. 4, in which the gate prevents the flow of blood in a reverse direction through the bore 19, and an open position, as illustrated in dotted lines in FIG. 4, in which blood is free to flow through the bore 19. The gate is mounted in the valve body in such a manner that its surfaces are completely washed with blood to prevent accumulations of blood which might be cause of clot formations. Also, the gate 25 is so designed that it eliminates stagnation pockets at which blood could collect. As will be explained in detail, the gate 25 opens very wide, at least about 80°, and is positively stopped in its open position so that the valve will not flutter or vibrate and thereby interfere with blood flow or cause turbulence which might damage red blood cells. The gate 25 is journaled for pivotal movement at locations within the flowing blood stream and at points spaced from an inner wall 26 on the valve body 17 defining the bore 19. Thus, any developing scar tissue or fibrils disposed about the outer surface of the valve body will not reach the areas of pivotal movement for the gate 25 and interfere with its movement.

Turning now to a detailed description of the individual elements comprising the valve 11, the valve body 17 is preferably of a low profile, i.e., axial length, and in the shape of an annular casing or ring. The valve body may be formed of various materials, preferably materials light in weight such as, for example, ceramics (mullite), titanium, molybdenum, carbon, graphite or other materials. To assure that the body is biologically inert to blood, it is coated with a dense isotropic pyrolytic carbon coating of the kind disclosed in copending application, Ser. No. 649,811, filed June 29, 1967, entitled Prosthetic Device, and as explained therein, such a pyrolytic carbon coating is particularly compatible with blood and tissue and is also wear resistant. The coated article may be treated with an anticoagulant, such as heparin.

To assist in securing the valve 11 in the heart, a circumferential groove 29 (FIGS. 4 and 6) is formed in an outer cylindrical wall 31 of the valve body 17 to receive an encircling ring 30 comprised of a plurality of strands of thread or wire wrapped in the groove. The strands may be formed of Dacron thread, tantalum wire, tungsten wire, or other similar material and are suitably tied together to provide a continuous strong ring. When the strands are made of wire, they are subsequently coated with carbon so that, as will be clear from the following description, the valve 11 may be 100% carbon coated. To facilitate suturing the valve 11 to the surrounding heart tissue 14, a plurality of suture-receiving grooves 32 are formed in the outer cylindrical wall 31 to intersect the circumferential groove at circumferentially spaced locations To accommodate a curved suturing needle 34, it is preferred that the suture-receiving grooves be disposed at a slight angle to the longitudinal dimension of the valve body and have a greater depth than the circumferential groove at points of intersection with the latter.

To provide a smooth flow of blood through the bore 19 of the valve body 17, it is preferred that the inner wall 26 defining the bore 19 have converging inlet and diverging outlet wall sections 33 and 35 (FIG. 4). These wall sections define generally tapered or frusto-conical surfaces with the large diameter portions of the surfaces being adjacent the inlet and outlets of the valve body. More specifically, from the inlet opening 21 of the valve body 17, the inwardly tapering wall sections 33 defines a passageway of decreasing cross-sectional area terminating in a shoulder 37. The shoulder 37 has a rounded outer surface to facilitate the smooth flow of the blood past it to the outlet wall section 35 which defines a passageway of increasing diameter in the direction of blood flow. The shoulder 37 extends only partially about the interior wall of the valve body and terminates in short end walls 41 which extend radially to a curved wall section 43 intermediate the wall sections 33 and 35. The curved wall 43 is offset axially in the downstream direction from the rounded shoulder 37, as necessary to provide an adequate seal in the closed position.

To facilitate a streamlined flow, the valve gate 25 is made in the form of a flat, thin circular disk 45 which in its open position (shown in dotted lines in FIG. 4) has a thin profile generally aligned with and almost parallel to the path of blood flow. A front face 47 and a rear face 49 for the disk 45 are flat, smooth and parallel to each other. The circumference 51 of the disk is rounded. Preferably, the disk is relatively thin in cross section and is formed of the same type of material as the valve body 17.

In accordance with an important aspect of the invention, the disk 25 is journaled at a location within the flow of the blood stream and spaced from the bore-defining wall 26 of the valve body to keep the bearing surfaces for the pivot mounting means washed clean by the flowing blood stream and to position these bearing surfaces where they will be free from entanglement with or binding by fibrils or scar tissue which might develop about the valve body. More specifically, the disk 45 of the valve gate is provided with a pair of fin supports 53 each having openings 55 through which projects pivot mounting means which, in this instance, is a pin 59 of circular cross section. The pin 59 spans the bore 19 and is fastened in openings 61 (FIG. 3) in the sidewall of the bore. The openings 55 in the fin supports 53 are at least about 20% larger in diameter than the diameter of the pivot pin 59 so that blood is adapted to flow through the openings 55 and clean them. This arrangement also permits a slight rocking of the disk 45 to facilitate its seating movement against the bore wall 26. The pivot pin 59 is preferably offset with respect to a diameter through said bore 19.

The fin supports 53 are integrally attached to the rear face 49 of the disk 45 and project laterally at right angles from the rear face 49 to extend downstream in the closed position. The fins 53 extend from the disk in the general direction of blood flow and are relatively thin in cross section to minimize their resistance to blood flow. Each fin is generally in the shape of a triangle with its free end blunted—cut off in this instance—to form a stop 63 which abuts the wall section 35 in the fully open position and limits the pivoting of the gate 25 to about 80° from a position normal to the axis of the bore 19. The fins 53 engage and pivot on bearing surfaces on the pivot pin at locations which are spaced apart from each other a distance sufficient to provide stable pivotal movement, and are also spaced a sufficient distance from the wall 26 to be well within the flowing stream of blood. Preferably, the fin supports 53 each are located on the pin 59 at a distance from the wall 26 (in a direction parallel to the axis of the pin) at least about equal to 25% of the free length of the pin (exclusive of the end portions which are fastened within the openings 61 in the sidewall of the valve body 17). This distance is measured along the pin from the sidewall to the center of the fin support as shown by $x$ in FIG. 2.

The pivot pin is stationary and does not rotate so the growth of fibrils or scar tissue about the ends of the pin will not interfere with the bearing surfaces for the pivotal mounting of the gate. The fins 53 thus mount the disk for rotation about the axis of the pivot pin 59, which axis is offset from the diameter of disk 45 itself, so that there is a mechanical advantage obtained when the blood pressure forces act on the rear disk face 49 to swing the disk to its closed position. In its closed position, an area of the disk edge 51 furthermost from the pivot pin 59 abuts the rounded shoulder 37 to limit the amount of pivoting in the closing direction. This offset pivotal mounting provides a progressive seating of the disk, a better force distribution and a cushioned closing effect.

When the valve 11 is disposed in position within the heart, the inlet opening 21 for the bore 19 is disposed in the right auricle and blood flowing through the valve bore 19 holds the gate 25 in its open position in which the disk 45 is within 10° from being parallel to the axis of the bore 19. In this position, the blood flowing through the valve washes both sides of the disk 45 and the surfaces of the fins 53. When the valve gate 25 is fully open, its stops 63 abut the wall section 35 and limits further opening movement of the gate and the fluid pressure holds the stop against the wall, thereby preventing fluttering or vibrating of the disk in the stream. Since the openings 55 in the fins 53 are considerably larger than the pivot pin 59, the blood is free to flow in and about the pin to keep these openings and the pins clean and free of accumulations.

When the heart builds up pressure on the blood in the right ventricle 13, the blood beginning to flow in a reverse direction through the valve bore 19 acts on the rear face 49 of the disk and pivots it toward its closed position in which, as illustrated in FIG. 3, the gate substantially blocks the flow of blood in a reverse direction through the bore 19 and into the right auricle 12. During this increase in pressure, the blood will pass from the right ventricle 13 out through the aorta artery 71 (FIG.1).

From the foregoing, it will be seen that the valve is simple in construction and is designed to be operated for long periods of time. The valve operation causes a minimum of turbulence in the blood stream, and the surfaces of the valve are washed to prevent the accumulation of blood in the pockets or any stagnation thereof.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A cardiac valve comprising a valve body having a wall defining a central bore including inlet and outlet openings through which blood may flow, means on said body for facilitating attachment thereof to animal tissue, a gate including a substantially circular disk portion having front and back surfaces proportioned for mounting in said body, means mounting said gate for pivotal movement between an open position in which said disk is disposed generally longitudinally of said bore so that blood washes across both said front and back surfaces to clean the same and a closed position in which said gate has its surfaces disposed substantially transversely of said bore blocking reverse flow of blood from said outlet opening to said inlet opening, said gate being journaled for pivotal movement at a position spaced substantially inwardly from said bore wall for operation unimpeded by fibril growths on said valve body, said means mounting said gate for pivotal movement having pin means and openings receiving said pin means with the surfaces of said openings and said pin means being washed by blood flowing through said bore, said valve being formed of inert and non-toxic material.

2. A cardiac valve in accordance with claim 1 in which said means to pivotally mount said gate is spaced by at least one-fourth of the diameter of said bore from said bore wall of said body.

3. A cardiac valve in accordance with claim 1 in which said gate includes a pair of fins extending laterally from the back surface of said disk, said fins having aligned openings therein of a given diameter constituting said openings for receiving said pin means, and in which said pin means includes a pivot pin projecting through said aligned openings and fixed to said valve body at its opposite ends, said pivot pin having a diameter smaller than said given diameter for said openings to permit rocking of said gate and blood to wash said pivot pin and said openings.

4. A cardiac valve in accordance with claim 3 in which said given diameter of said openings is approximately 20% greater than the diameter of said pin.

5. A cardiac valve in accordance with claim 1 in which the mounting means to pivot said gate includes a pivot pin spanning a portion of said bore but offset from a diameter thereof, and in which fins are provided on said disk with openings to receive said pin and pivotally mount the disk for pivoting about an axis offset from the disk and a diameter for said bore, said disk having an edge for abutting said wall defining said bore to limit the closing movement of said disk.

6. A cardiac valve comprising a valve body having a wall defining a central bore including inlet and outlet openings through which blood may flow, means on said body for facilitating attachment thereof to animal tissue, a gate including a substantially circular disk portion having front and back surfaces proportioned for mounting in said body, means mounting said gate for pivotal movement between an open position in which said disk is disposed generally longitudinally of said bore so that blood washes across both said front and back surfaces to clean the same and a closed position in which said gate has its surfaces disposed substantially transversely of said bore for blocking reverse flow of blood from said outlet opening to said inlet opening, said gate being journaled for pivotal movement at a position spaced substantially inwardly from said bore wall for operation unimpeded by fibril growth on said valve body, said mounting means for said gate including a pivot pin fixed in said body and spanning said bore, said gate having at least one opening through which projects said pivot pin, said opening being approximately 20 percent larger than the diameter of the pivot pin, thereby allowing blood to flow through said opening to wash the latter and said pin, said valve being formed of inert and non-toxic material.

7. A cardiac valve comprising a valve body having a wall defining a central bore including inlet and outlet openings through which blood may flow, means on said body for facilitating attachment thereof to animal tissue, a gate including a substantially circular disk portion having front and back surface proportioned for mounting in said body, means mounting said gate for pivotal movement between an open position in which said disk is disposed generally longitudinally of said bore so that blood washes across said front and back surfaces to clean the same and a closed position in which said gate has its surfaces disposed substantially transversely of said bore for blocking reverse flow of blood from said outlet to said inlet opening, said pivot mounting means positioned to be washed by blood and including a pivot pin spanning said bore and fixed to said valve body, said disk being provided with a pair of fins projecting normally from said disk and spaced substantially inwardly from said bore wall for operation unimpeded by fibril growth on said valve body, said fins having openings for receiving said pivot pin and mounting said disk for pivoting about an axis offset from said disk and offset from a diameter for said bore, said openings being sufficiently larger than said pivot pin to permit blood to flow therethrough and to wash the same, said valve being formed of inert and non-toxic material.

8. A cardiac valve comprising a valve body having a central bore including inlet and outlet openings through which blood may flow, a gate including a substantially circular disk portion having front and back surfaces proportioned for mounting in said body, means mounting said gate for pivotal movement between an open position in which said disk is disposed generally longitudinally of said bore so that blood washes across both said front and back surfaces to clean the same and a closed position in which said gate has its surfaces disposed substantially transversely of said bore blocking reverse flow of blood from said outlet opening to said inlet opening, an outer wall on said valve body being formed with a circumferential groove, a ring for receiving sutures wrapped in said circumferential groove, and grooves for receiving sutures formed in said outer wall and intersecting said circumferential groove at circumferentially spaced locations.

References Cited

UNITED STATES PATENTS

| | | | |
|---|---|---|---|
| 2,711,188 | 6/1955 | Nickerson | 137—527.8 |
| 3,072,141 | 1/1963 | Wheeler | 137—527.8 XR |
| 3,155,112 | 11/1964 | Rosser | 137—527.8 |
| 3,374,489 | 3/1968 | Diaz | 3—1 |
| 3,448,465 | 6/1969 | Pierce et al. | 3—1 |

OTHER REFERENCES

German printed Application 1,011,681—4 July 1957—Bopp et al.—137—527.

RICHARD A. GAUDET, Primary Examiner

R. L. FRINKS, Assistant Examiner

U.S. Cl. X.R.

137—527.8

UNITED STATES PATENT OFFICE

CERTIFICATE OF CORRECTION

Patent No. 3,546,711 Dated December 15, 1970

Inventor(s) Jack C. Bokros

It is certified that error appears in the above-identified patent and that said Letters Patent are hereby corrected as shown below:

In the drawing, the inventor's name is misspelled as "Boyros at the top of the page.

Column 2, line 70, after "locations" insert --.--;
Column 6, line 6, before "said" insert --both--;
Column 6, line 9, after "outlet" insert --opening--.

Signed and sealed this 6th day of April 1971.

(SEAL)
Attest:

EDWARD M.FLETCHER,JR.
Attesting Officer

WILLIAM E. SCHUYLER, JI
Commissioner of Patent: